United States Patent Office 3,733,322
Patented May 15, 1973

3,733,322
N - (AMINODIALKYL)THIENYL[3,2-b]THIOPHENE-2-CARBOXAMIDES AND METHODS OF PREPARATION
William Blythe Wright, Jr., Woodcliff Lake, N.J., assignor to American Cyanamid Company, Stamford, Conn.
No Drawing. Filed June 16, 1971, Ser. No. 153,864
Int. Cl. C07d 87/46
U.S. Cl. 260—247.1         6 Claims

ABSTRACT OF THE DISCLOSURE

The preparation of N-(aminoalkyl)-thieno[3,2-b]thiophene-2-carboxamides by the reaction of a thieno[3,2-b]thiophene-2-carbonyl chloride with an alkylenediamine derivative is described. Other methods of preparing N-(aminoalkyl)thieno[3,2-b]thiophene - 2 - carboxamides are described. The latter products are useful for their antidepressant, anti-inflammatory and analgesic properties.

DESCRIPTION OF THE INVENTION

This invention relates to new compounds and methods of preparation. More particularly, it relates to N-(aminoalkyl)-thieno[3,2-b]thiophene-2-carboxamides and methods of preparation.

The novel compounds of the present invention may be illustrated by the following formula:

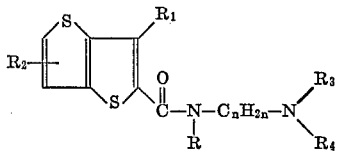

wherein R is selected from the group consisting of hydrogen and lower alkyl; $R_1$ and $R_2$ are selected from the group consisting of hydrogen, halogen, and lower alkyl; $n$ is an integer from 2 to 5; $R_3$ and $R_4$ are selected from the group consisting of hydrogen, lower alkyl, lower alkenyl and phenyl(lower alkyl), and when taken together with the nitrogen are 1-pyrrolidinyl, piperidino, 4-phenylpiperidino, morpholino, hexamethyleneimino, 1-lower alkyl-4-piperazinyl, 1-phenyl-4-piperazinyl and 4-phenyl-$\Delta^3$-piperidino and non-toxic acid addition salts thereof.

The free bases of the active compounds of this invention, in general, may be either liquids or solids at room temperature. The free bases are, in general, relatively insoluble in water, but soluble in most organic solvents such as lower alkyl alcohols, ether, acetone, chloroform, and the like. These compounds form acid addition salts with strong acids, such as hydrochloric acid, sulfuric acid, perchloric acid and the like. The compounds also form salts with organic acids, as for example, fumaric and maleic acid. Such salts, in general are soluble in water, methanol and ether, but relatively insoluble in benzene, ether, petroleum ether and the like.

In the description of the compounds of this invention the term lower alkyl includes those having one to four carbon atoms; lower alkenyl, those having 3 to 4 carbon atoms; halogen includes chlorine, bromine, iodine or fluorine.

The compounds of this invention may be prepared by the following method which has been found most desirable.

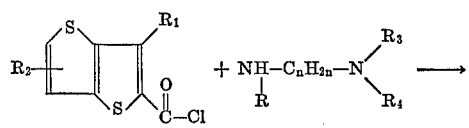

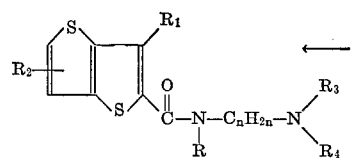

wherein R, $R_1$, $R_2$, $R_3$, $R_4$ and $n$ are as defined above.

In this process, the thieno[3,2-b]thiophene-2-carbonyl chloride is treated with an alkylenediamine derivative and the products are recovered and purified by recrystallization from a suitable solvent. Alternatively, an ester or anhydride may be used as an intermediate.

The compounds of the present invention can also be prepared by other methods. One of these involves the preparation of a reactive thieno[3,2-b]thiophene-2-carboxamide as an intermediate followed by reaction with the alkylenediamine as follows:

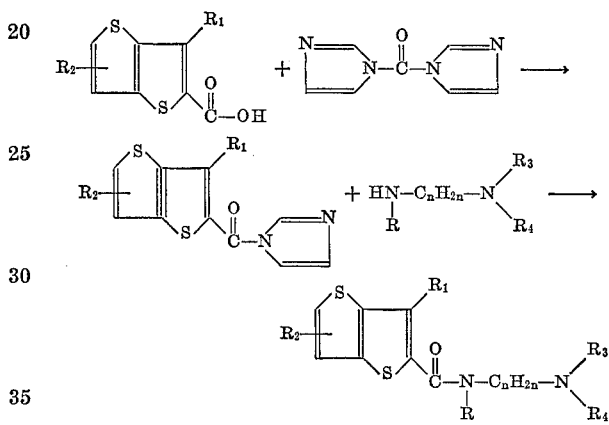

wherein R, $R_1$, $R_2$, $R_3$, $R_4$ and $n$ are as hereinbefore defined. This reaction is best carried out in two steps and tetrahydrofuran is a satisfactory solvent. A temperature range of 25–75° C. is most desirable.

The compounds of the present invention are useful as antidepressant agents and in meliorating inflammation and pain in warm-blooded animals.

The anti-depressant properties of the compounds of the present invention are evident by measuring the ability to counteract in animals a depression induced by the administration of tetrabenazine hexamate. The following tests were carried out: Doses of 25 milligrams per kilogram of the test compounds are administered intraperitoneally to 5 mice one hour before the administration of tetrabenazine hexamate at a dose of 30 mg./kg. (intraperitoneal) which is known to depress markedly the exploratory behavior of normal mice. Thirty minutes later the mice are tested for their exploratory behavior. If 4 or more of 15 mice show exploratory behavior (significant P=less than 0.05), than graded doses of the active test compounds are administered to additional groups of 5 mice. The antidepressant treated groups show normal exploratory behavior, while the control groups and groups treated with an ineffective antidepressant agent, do not show this normal exploratory behavior, but show the well known, profound depression induced by tetrabenazine. The results from several dose levels are used to establish effective dose ranges. This method has been described by Greenblatt, E. N. and Osterberg, A. C. in Toxicology and Applied Pharmacology 7, pp. 566–578 (1965).

A useful test for anti-inflammatory activity consists of determining the drug-induced suppression of inflammation in the paws of rats injected with dilute aqueous solutions of carrageenin, according to C. A. Winter, E. A. Risley, and G. W. Nuss, Proceedings of the Society for Experimental Biology and Medicine, vol. 111, pp. 544–547 (1962). By this method, rats are injected in the right hind paw with 0.05 milliliter of 1% carrageenin and the volume of the resulting edema is measured by displacement of mercury after four hours. The volume of the edema in the drug-treated (250 mg./kg. orally) animals is compared with that of the untreated controls in the form of a control to treated ratio. The geometric mean of the ratios measured in a two-stage sequential screening procedure is determined. A two-stage mean ratio of >1.43 indicates the test compounds of this invention are accepted as active anti-inflammatory agents when compared to parallel controls.

The compounds of the present invention are active analgesics when measured by the "writhing syndrome" test for analgesic activity as described by Siegmund, et al., Proceedings of the Society for Experimental Biology and Medicine, vol. 95, p. 729 (1957), with modifications. This method is based upon the reduction of the number of writhes following the intraperitoneal injection of one mg./kg. of body weight of phenyl p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl p-quinone. The test compound is administered orally to groups of two mice each 30 minutes before injection of the phenyl p-quinone. The total number of writhes exhibited by each group of mice is recorded for a 3 minute period commencing 15 minutes after injection of the phenyl p-quinone. A compound is considered active if it reduces the total number of writhes in two test mice from a control value of approximately 30 per pair of a value of 18 or less.

The following Table I summarizes results obtained on representative compounds of the present invention using the above tests.

TABLE I

[Activity of representative compounds]

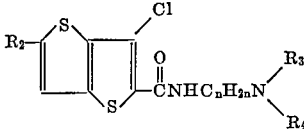

| $R_2$ | $n$ | $\begin{array}{c}R_3\\ \diagdown\\ N\\ \diagup\\ R_4\end{array}$ | Antidepressant, 25 mg./kg. | Anti-inflammatory, 250 mg./kg. | Analgesic, 200 mg./kg. |
|---|---|---|---|---|---|
| Br | 2 |  | A | R | R |
| Cl | 3 | 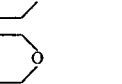 | A | | R |
| Cl | 2 | 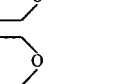 | A | A | R |
| H | 2 |  | R | A | R |
| Cl | 2 |  | R | A | R |
| Cl | 3 |  | R | A | R |
| Br | 3 |  | R | A | R |
| H | 3 | 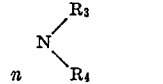 | R | R | A |
| CH₃ | 2 | 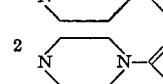 | R | | A |

TABLE 1—Continued

| $R_2$ | $n$ | $\begin{array}{c}R_3\\ \diagdown\\ N\\ \diagup\\ R_4\end{array}$ | Antidepressant, 25 mg./kg. | Anti-inflammatory, 250 mg./kg. | Analgesic, 200 mg./kg. |
|---|---|---|---|---|---|
| H | 2 | 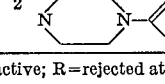 | R | R | A |
| H | 2 | | R | R | A |

A=active; R=rejected at the dosage level tested.

The compositions containing N-(aminoalkyl)thieno-[3,2-b]thiophene-2-carboxamides may be administered to warm-blooded animals orally, or parenterally if desired, and when so administered, may be considered as an antidepressant, anti-inflammatory or analgesic agent in warm-blooded animals of about 50–90 kilos in doses ranging from about 25–500 milligrams. The dosage regimen can be adjusted to provide optimum therapeutic response. Thus, for example, several doses may be administered daily, or the dose may be reduced proportionately as indicated by the requirements of the particular therapeutic situation.

For therapeutic administration the active components of this invention may be incorporated with pharmaceutical carriers and used, for example, in the form of tablets, dragées, capsules, suppositories, liquids, elixirs, emulsions, suspensions, syrups, chocolate, candy, water, chewing gum, or the like. Such compositions and preparations should contain at least 0.1% of active component. The percentage in the compositions and preparations, may, of course, be varied, and may conveniently be between 2% and 60% or more of the weight of the unit. The amount of active component in such therapeutically useful compositions or preparations is such that a suitable dosage will be obtained. Preferred compositions or preparations according to the present invention are prepared so that a dosage unit form contains between about 25 and about 500 milligrams of the N-(aminoalkyl)thieno[3,2-b]thiophene-2-carboxamide.

The compositions of this invention are physiologically active. As such, they can be incorporated in various pharmaceutical forms such as tablets, capsules, pills, and so forth, for immediate or sustained release, by combining with suitable pharmaceutical carriers. They may be in the form of dosage for a single therapeutic dose or in small units for multiple dosages or in larger units for division into single doses. Obviously, in addition to the therapeutic compound there may be present excipients, binders, fillers and other therapeutically inert ingredients necessary in the formulation of the desired pharmaceutical preparation.

Chemical intermediates can be prepared by the procedure described hereinafter in Example 1, or by procedures described in one of the following references: F. Challenger and G. M. Gibson, J. Chem. Soc. 1940, 305; V. P. Litvinov, G. Fraenkel, Izv. Akad. Nauk. SSSR, Ser. Khim. 1968 (8), 1828–35; V. P. Litvinov and Ya. L. Gol'dfarb, Izv. Akad. Nauk. SSSR, Ser. Khim. 1963 (12), 2183–92; Ya. L. Gol'dfarb, V. P. Litvinov and S. A. Ozolin, Izv. Akad. Nauk. SSSR, Ser. Khim. 1965 (3), 510–15; Andreas Bugge, Acta Chem. Scand. 1968, 22 (1), 63–69.

The following specific examples illustrate the preparation of representative compounds of the present invention. Parts are by weight unless otherwise indicated.

EXAMPLE 1

Preparation of 3-chloro-N-(2-morpholinoethyl)thieno-[3,2-b]thiophene-2-carboxamide A mixture of 46 parts of thiophene-2-acrylic acid, 2.0 parts of pyridine and 166 parts of thionyl chloride is heated on the steam bath for 3 days and then concentrated. The residue is triturated with 100 parts of petroleum ether and the insoluble material is filtered off and recrystallized from hexane. The product is 3-chlorothieno-[3,2-b]thiophene-2-carbonyl chloride, melting point 131–134° C.

A solution of 4.0 parts of 3-chlorothieno[3,2-b]thiophene-2-carbonyl chloride in 50 parts of benzene is added to a stirred mixture of 3.0 parts of morpholinoethylamine, 2.0 parts of sodium carbonate, 50 parts of water and 50 parts of benzene. After three hours, the layers are separated, and the benzene layer is washed with water and concentrated to remove the solvent. The crystalline residue is recrystallized from ethyl acetate. The 3-chloro-N-(2-morpholinoethyl)thieno[3,2-b]thiophene - 2-carboxamide melts at 115–117° C.

When the above material is dissolved in ethanol and ethanolic hydrochloric acid is added, 3-chloro-N-(2-morpholinoethyl)thieno[3,2-b]thiophene - 2 - carboxamide hydrochloride, melting point 247–249° C., is obtained.

EXAMPLE 2

Preparation of 3-chloro-N-(3-morpholinopropyl)thieno[3.2-b]thiophene-2-carboxamide hydrochloride The above material, melting point 258–260° C. is obtained when 3-morpholinopropylamine is substituted for morpholinoethylamine in the procedure of Example 1.

EXAMPLE 3

Preparation of 3-chloro-N-[2-(4-phenylpiperidino)ethyl]thieno[3,2-b]thiophene-2-carboxamide This compound, melting point 91–93° C., is obtained when 2-(4-phenylpiperidino)ethylamine is substituted for morpholinoethylamine in the procedure of Example 1. The hydrochloride salt melts at 242–244° C.

EXAMPLE 4

Preparation of 3-chloro-N-[2-(4-phenyl-$\Delta^3$-piperidino)ethyl]thieno[3,2-b]thiophene-2-carboxamide When 2-(4-phenyl-$\Delta^3$-piperidino)ethylamine is substituted for morpholinoethylamine in the procedure of Example 1, the above compound, metling point 139–140° C., is obtained. The hydrochloride salt melts at 219–221° C.

EXAMPLE 5

Preparation of 3-chloro-N-[3-(4-phenyl-$\Delta^3$-piperidino)propyl]thieno[3,2-b]thiophene-2-carboxamide The above compound, melting point 122–124° C., is obtained when 3-(4-phenyl-$\Delta^3$-piperidino)propylamine is substituted for morpholinoethylamine in the procedure of Example 1.

EXAMPLE 6

Preparation of 3-chloro-N-[2-(4-phenyl-1-piperazinyl)ethyl]thieno[3,2-b]thiophene-2-carboxamide When 2-(4-phenyl-1-piperazinyl)ethylamine is substituted for morpholinoethylamine in the procedure of Example 1, the above compound, melting point 159–161° C., is obtained. The hydrochloride salt melts at 262–264° C.

EXAMPLE 7

Preparation of 3-chloro-N-(3-hexamethyleneiminopropyl)thieno[3,2-b]thiophene-2-carboxamide This compound is obtained when 3-hexamethyleneiminopropylamine is substituted for morpholinoethylamine in the procedure of Example 1.

EXAMPLE 8

Preparation of 3-chloro-N-(5-morpholinopentyl)thieno-[3,2-b]thiophene-2-carboxamide The above compound is obtained when 5-morpholinopentylamine is substituted for morpholinoethylamine in the procedure of Example 1.

EXAMPLE 9

Preparation of 3-chloro-N-[2-(1-pyrrolidinyl)ethyl]thieno[3,2-b]thiophene-2-carboxamide When 2-(1-pyrrolidinyl)ethylamine is substituted for morpholinoethylamine in the procedure of Example 1, the above compound is obtained. The hydrochloride salt melts at 165–167° C.

EXAMPLE 10

Preparation of 3-chloro-N-[3-(allylmethylamino)propyl]thieno[3,2-b]thiophene-2-carboxamide This compound is obtained when 3-allylmethylaminopropylamine is substituted for morpholinoethylamine in the procedure of Example 1.

EXAMPLE 11

Preparation of 3,5-dichloro-N-(2-morpholinoethyl)thieno[3,2-b]thiophene-2-carboxamide The above compound, melting point 119–121° C., is obtained when 5-chlorothiophene-2-acrylic acid is substituted for thiophene-2-acrylic acid in the procedure of Example 1.

EXAMPLE 12

Preparation of 5-bromo-3-chloro-N-(2-morpholinoethyl)thieno[3,2-b]thiophene-2-carboxamide This compound is obtained when 5-bromothiophene-2-acrylic acid is substituted for thiophene-2-acrylic acid in the procedure of Example 1. The hydrochloride salt melts at 238–240° C.

EXAMPLE 13

Preparation of 5-bromo-3-chloro-N-[3-(4-methyl-1-piperazinyl)-propyl]thieno[3,2-b]thiophene-2-carboxamide When 3-(4-methyl-1-piperazinyl)propylamine is treated with 5-bromo-3-chlorothieno[3,2-b]thiophene-2-carbonyl chloride as described in Example 1, the above compound is obtained. The dihydrochloride salt melts at 280–282° C.

EXAMPLE 14

Preparation of 3-chloro-N-methyl-N-(2-morpholinoethyl)thieno[3,2-b]thiophene-2-carboxamide This compound is obtained when N-methylmorpholinoethylamine is substituted for morpholinoethylamine in the procedure of Example 1.

EXAMPLE 15

Preparation of 3,5-dichloro-N-(3-morpholinopropyl)thieno[3,2-b]thiophene-2-carboxamide When 3,5-dichlorothieno[3,2-b]thiophene - 2 - carbonyl chloride is treated with 3-morpholinopropylamine as described in Example 1, the above compound, melting point 85–87° C. is obtained.

EXAMPLE 16

Preparation of 5-bromo-3-chloro-N-(3-morpholinopropyl)thieno[3,2-b]thiophene-2-carboxamide When 5 - bromo-3-chlorothieno[3,2-b]thiophene-2-carbonyl chloride and 3-morpholinopropylamine are reacted together as described in Example 1, the above compound is obtained. The melting point of the hydrochloride salt is 245–247° C.

EXAMPLE 17

Preparation of 3-chloro-5-methyl-N-(morpholinoethyl) thieno[3,2-b]thiophene-2-carboxamide A mixture of 16.8 parts of 5-methylthiophene-2-acrylic acid, 0.8 part of pyridine, 100 parts of toluene and 60 parts of thionyl chloride is heated at reflux temperature for 68 hours. The hot toluene layer is decanted from some tarry material and concentrated and the residue is recrystallized from hexane. The crystalline product, melting point 135–137° C., is 3-chloro-5-methylthieno[3,2-b] thiophene-2-carbonyl chloride.

A mixture of 2.0 parts of the above product, 100 parts of benzene, 50 parts of water, 1.0 part of sodium carbonate, and 2.0 parts of morpholinoethylamine is stirred for 5 hours and the layers are separated. The benzene layer is washed with water and concentrated and the residue is recrystallized from ethyl acetate. The 3-chloro-5 - methyl-N-(morpholinoethyl)thieno[3,2-b]thiophene-2-carboxamide melts at 112–114° C. The hydrochloride salt melts at 232–234° C.

EXAMPLE 18

Preparation of 3-chloro-5-methyl-N-(3-morpholinopropyl)thieno[3,2-b]thiophene-2-carboxamide This compound is obtained when 3-morpholinopropylamine is substituted for morpholinoethylamine in the procedure of Example 17. The hydrochloride salt melts at 263–265° C.

EXAMPLE 19

Preparation of 3,5-dichloro-N-[2-(1-pyrrolidinyl)ethyl] thieno[3,2-b]thiophene-2-carboxamide The above compound is obtained when 3,5-dichlorothieno[3,2-b]thiophene-2-carbonyl chloride is treated with 2-(1-pyrrolidinyl)ethylamine as described in Example 1. The hydrochloride salt melts at 182–184° C.

EXAMPLE 20

Preparation of 3,5-dichloro-N-[3-(1-pyrrolidinyl)propyl] thieno[3,2-b]thiophene-2-carboxamide When 3,5-dichlorothieno[3,2-b]thiophene - 2 - carbonyl chloride is treated with 3-(1-pyrrolidinyl)propylamine as described in Example 1, the above compound is obtained. The hydrochloride salt melts at 178–180° C.

EXAMPLE 21

Preparation of 3,5-dichloro-N-(2-aminoethyl)thieno-[3,2-b]thiophene-2-carboxamide This compound is obtained when 3,5-dichlorothieno-[3,2-b]thiophene-2-carbonyl chloride is treated with ethylenediamine as described in Example 1.

EXAMPLE 22

Preparation of 5-bromo-3-chloro-N-(3-dimethylaminopropyl)thieno[3,2-b]thiophene-2-carboxamide If 5 - bromo-3-chlorothieno[3,2-b]thiophene-2-carbonyl chloride and 3-dimethylaminopropylamine are reacted together as described in Example 1, this compound is obtained. The hydrochloride salt melts at 203–205 °C.

EXAMPLE 23

Preparation of 3-chloro-N-(3-dibutylaminopropyl) thieno[3,2-b]thiophene-2-carboxamide This compound is obtained when 3-dibutylaminopropylamine is substituted for morpholinoethylamine in the procedure of Example 1.

EXAMPLE 24

Preparation of 3-chloro-N-(2-benzylmethylaminoethyl) thieno[3,2-b]thiophene-2-carboxamide When 2-benzylmethylaminoethylamine is substituted for morpholinoethylamine in the procedure of Example 1, the above compound is obtained.

EXAMPLE 25

Preparation of 3-chloro-N-(2-morpholinoethyl)thieno-[3,2-b]thiophene-2-carboxamide A mixture of 2.4 parts of 3-chlorothieno[3,2-b]thiophene-2-carboxylic acid, 1.8 parts of N,N'-carbonyldiimidazole and 50 parts of tetrahydrofuran is allowed to stand for one hour and 2.0 parts of morpholinoethylamine are added. The mixture is allowed to stand overnight and is then concentrated to remove solvent and diluted with water. The reaction product is extracted into benzene. The benzene solution is washed with water and concentrated. The crystalline residue is recrystallized from ethyl acetate. The 3 - chloro-N - (2 - morpholinoethyl)thieno-[3,2-b]thiophene-2-carboxamide melts at 115–117° C.

EXAMPLE 26

Preparation of N-(2-morpholinoethyl)thieno[3,2-b] thiophene-2-carboxamide

This compound is obtained when thieno[3,2-b]thiophene-2-carboxylic acid is treated with N,N'-carbonyldiimidazole and morpholinoethylamine as described in Example 25.

EXAMPLE 27

Preparation of 3-bromo-N-(2-morpholinoethyl)thieno-[3,2-b]thiophene-2-carboxamide When 3 - bromothieno[3,2-b]thiophene - 2 - carboxylic acid is treated with N,N'-carbonyldiimidazole and morpholinoethylamine as described in Example 25, the above compound is obtained.

EXAMPLE 28

Preparation of 5-ethyl-3-methyl-N-(2-morpholinoethyl) thieno[3,2-b]thiophene-2-carboxamide If 5-ethyl-3-methylthieno[3,2-b]thiophene-2-carboxylic acid is treated with N,N'-carbonyldiimidazole and morpholinoethylamine as described in Example 25, the above compound is obtained.

EXAMPLE 29

Preparation of 3-chloro-N-[3-(methylphenethylamino) propyl]thieno[3,2-b]thiophene-2-carboxamide This compound is obtained when 3-(methylphenethylamino)propylamine is substituted for morpholinoethylamine in the procedure of Example 1.

EXAMPLE 30

Preparation of N-butyl-3-chloro-N-(morpholinoethyl) thieno[3,2-b]thiophene-2-carboxamide The above compound is obtained when N-butylmorpholinoethylamine is substituted for morpholinoethylamine in the procedure of Example 1.

What is claimed is:

1. A compound of the formula:

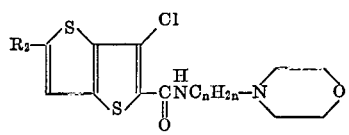

wherein $R_2$ is selected from the group consisting of hydrogen, bromine, chlorine and methyl; $n$ is an integer from 2 to 5 and non-toxic acid addition salts thereof.

2. The compound in accordance with claim 1, 3,5-dichloro-N-(2-morpholinoethyl)thieno[3,2-b]thiophene - 2-carboxamide.

3. The compound in accordance with claim 1, 5-bromo - 3 - chloro-N-(2-morpholinoethyl)thieno[3,2-b]thiophene-2-carboxamide.

4. The compound in accordance with claim 1, 3,5-dichloro - N - (3 - morpholinopropyl)thieno[3,2-b]thiophene-2-carboxamide.

5. The compound in accordance with claim 1, 3-chloro-5-methyl - N - 2 - (morpholinoethyl)thieno[3,2-b]thiophene-2-carboxamide.

6. The compound in accordance with claim 1, 3-chloro-N-(3-morpholinopropyl)thieno[3,2-b]thiophene - 2 - carboxamide hydrochloride.

No references cited.

ALEX MAZEL, Primary Examiner

J. TOVAR, Assistant Examiner

U.S. Cl. X.R.

260—268 BC, 293.57, 326.3, 332.2 C; 424—248